United States Patent [19]

Mietzel

[11] Patent Number: 5,144,887
[45] Date of Patent: Sep. 8, 1992

[54] BEAN SNIPPER

[75] Inventor: Dennis O. Mietzel, Columbus, Wis.

[73] Assignee: Hughes Company, Inc., Columbus, Wis.

[21] Appl. No.: 666,389

[22] Filed: Mar. 8, 1991

[51] Int. Cl.⁵ .............................................. A23N 15/12
[52] U.S. Cl. ........................................ 99/636; 99/639; 99/643
[58] Field of Search ................ 99/635, 636, 637, 638, 99/639, 643, 644, 546; 366/222, 223, 225, 233; 130/30 R; 209/626, 664, 288, 396

[56] References Cited

U.S. PATENT DOCUMENTS

| | | |
|---|---|---|
| 1,351,143 | 8/1920 | Vaudreuil . |
| 1,400,290 | 12/1921 | Johannes ............................ 99/636 |
| 1,436,746 | 11/1922 | Wolfe ................................. 99/636 |
| 1,897,664 | 2/1933 | Hansen ............................... 99/636 |
| 2,376,062 | 5/1945 | Kerr .................................... 99/636 |
| 2,393,461 | 1/1946 | Finley . |
| 2,518,598 | 8/1950 | Buck . |
| 3,010,498 | 11/1961 | Carlson . |
| 3,102,567 | 9/1963 | Hamilton . |
| 3,885,697 | 5/1975 | Urschel . |
| 4,213,383 | 7/1980 | Burton . |
| 4,528,902 | 7/1985 | Mietzel ............................. 130/30 R |
| 4,981,073 | 1/1991 | Zittel ................................. 99/643 |

Primary Examiner—Timothy F. Simone
Attorney, Agent, or Firm—Lathrop & Clark

[57] ABSTRACT

A bean snipper has a rotatable drum with a central passage extending therethrough which has an opening adapted to admit beans and an opening adapted to allow the exit of beans. The surface of the drum has portions defining a plurality of slots which extend circumferentially and which permit the beans inserted therein to protrude outwardly of the drum. A plurality of planar baffles are axially spaced within the drum and have portions defining a central passage for beans therein. A plurality of bean support rods extend between adjacent planar baffles and the rods are spaced radially inwardly from the drum surface and extend substantially perpendicularly to the baffles. The rods are adapted to support a bean with its end inserted in a slot. A snipper knife is located outside the drum and is adapted to snip the end of a bean protruding beyond the surface of the drum.

10 Claims, 3 Drawing Sheets

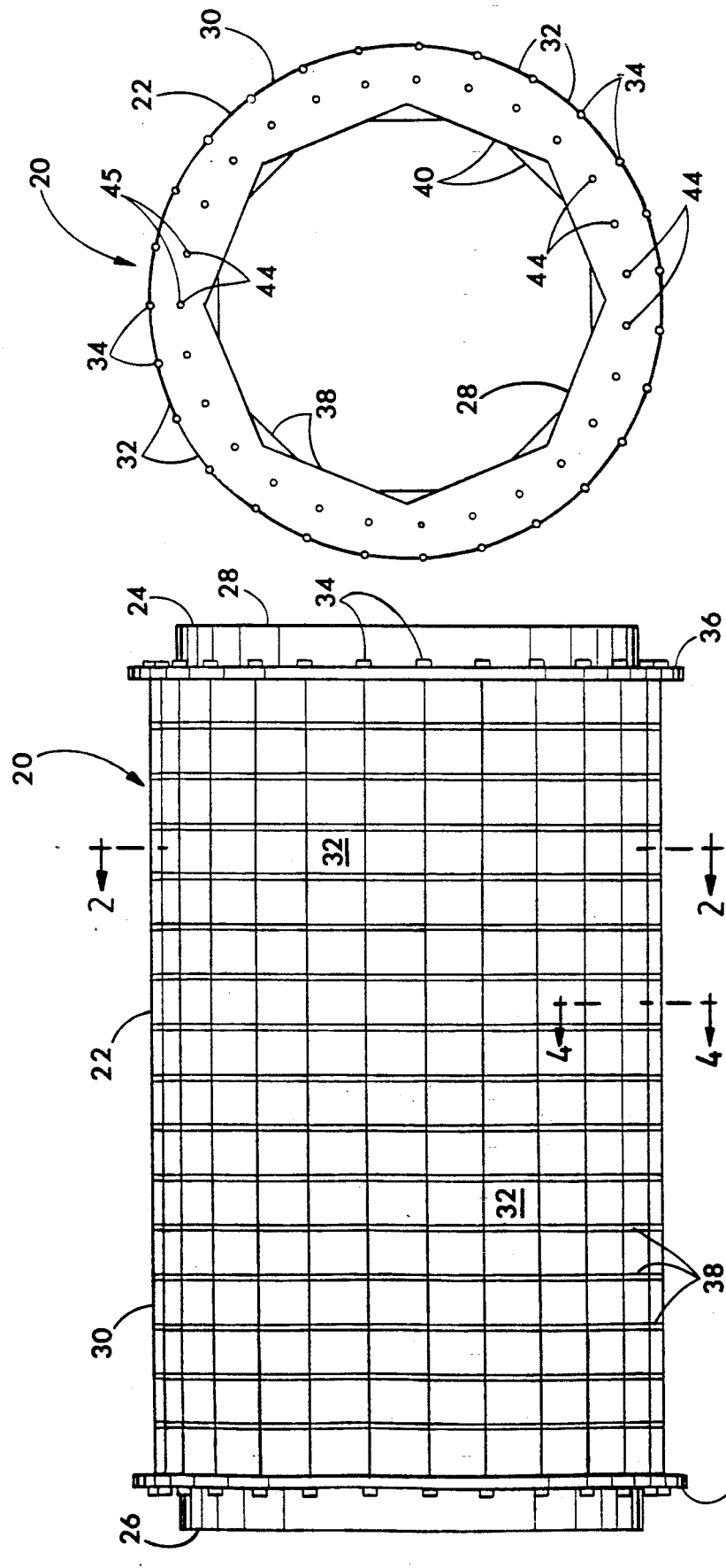

BEAN SNIPPER

FIELD OF THE INVENTION

The present invention relates to vegetable processing machines in general and to machines for snipping the ends off beans in particular.

BACKGROUND OF THE INVENTION

Beans, such as green beans, as harvested have a central edible pod with blossom and stem ends which are fibrous and non-tender. These ends have a low palatablility and are shunned by the consumers of the beans. Therefore, prior to canning and marketing beans it is essential to remove as many of the stem and blossom ends as possible.

Specialized machines known as bean snippers have long been used to remove the ends from a flow of beans prior to canning or packaging. A conventional bean snipper has a rotatable drum formed from a number of cylindrical shell sections with slots extending circumferentially. The slots are adapted to allow the ends of beans to protrude as they tumble in the rotating drum. Knives sliding on the rotating exterior of the cylindrical sections cut off the protruding undesirable blossom and stem ends. Axially spaced partitions within the drum are adapted to maximize the likelihood that pods being processed in the drum will enter the slots so that the bean ends will protrude through the slots for snipping. A passageway in each partition allows the beans to migrate down the length of the rotating drum when the drum is elevated at one end.

Invariably stalks, leaves, malformed beans, and other unpalatable or otherwise undesirable trash is harvested along with the beans. To present the bean consumer with pure beans uncontaminated by such trash, it is desirable to separate the stalks and other thin material from the beans within the bean snipper apparatus.

The molded plastic cylindrical shell sections or pockets which form the walls of the snipper drum are generally of two types: those with straight slots, and those with wavy slots. The straight slot pockets advantageously allow a thicker stalk to exit the drum for a given slot width. However, straight slots do not restrain the bean ends inserted therein and allow the beans to slide in the process of being snipped. This sliding results in an unappealing and undesirable ragged end cut.

The wavy slot pockets clasp the bean ends more securely than the straight slot pockets, but because of the slot geometry, restrict the escape of trash and are liable to blockage.

The positioning of a bean with proper orientation in a slot for effective snipping is achieved by a random process. The snipper drum is rotated to provide an even shower of beans into the drum slots below. A bean may fall so that it is parallel with a slot, at an angle within the plane of a slot, or generally perpendicular to the slot, with its end protruding outside the drum. Only the last possibility will result in satisfactory snipping of a bean end.

In the random travel of the thousands of beans from the entrance to the exit of the snipper drum, it is desired that each bean twice fall into a slot in proper orientation, once to snip the blossom end and once to snip the stem end. Modifications of the interior drum geometry have been attempted to increase the probability of a bean reaching a slot in the proper orientation. Screens above the slots and baffles on either side of the slots have been employed, although still having bean snipping performance that is not fully satisfactory. Planar baffles axially spaced along the length of the drum have been found effective in reducing the percentage of beans which fall into the pockets and lie across the slots.

Although conventional bean snippers are effective in snipping well over 90 percent of the bean ends, even a few percent of unsnipped beans are undesirable and appreciably reduce the quality of the processed beans.

What is needed is an apparatus which effectively snips ends of a high percentage of beans introduced therein.

SUMMARY OF THE INVENTION

The bean snipper of this invention has a rotatable drum with a central passage extending therethrough which has an opening adapted to admit beans and an opening adapted to allow the exit of beans. The surface of the drum has portions defining a plurality of slots which extend circumferentially and which permit the beans inserted therein to protrude outwardly of the drum surface. A plurality of planar baffles are axially spaced within the drum and have portions defining a central passage for beans therein. A plurality of bean support rods extend between adjacent planar baffles and the rods are spaced radially inwardly from the drum surface and extend substantially perpendicularly to the baffles. The rods are adapted to support a bean with its end inserted in a slot. A snipper knife is located outside the drum and is adapted to snip the end of a bean protruding beyond the surface of the drum.

It is an object of the present invention to provide a bean snipper which supports the beans within slots for effective snipping.

It is also an object of the present invention to provide a bean snipper which permits the escape of stalks and other trash.

It is an additional object of the present invention to provide a bean snipper which increases the probability that a bean traveling therethrough will have both ends snipped.

Further objects, features, and advantages of the invention will be apparent from the following detailed description when taken in conjunction with the accompanying drawings.

BRIEF DESCRIPTION OF THE DRAWINGS

FIG. 1 is a side elevational view of the rotatable drum of the bean snipper of this invention.

FIG. 2 is a cross-sectional view of the rotatable drum of FIG. 1 taken along section line 2—2.

DESCRIPTION OF THE PREFERRED EMBODIMENT

Figure 3:
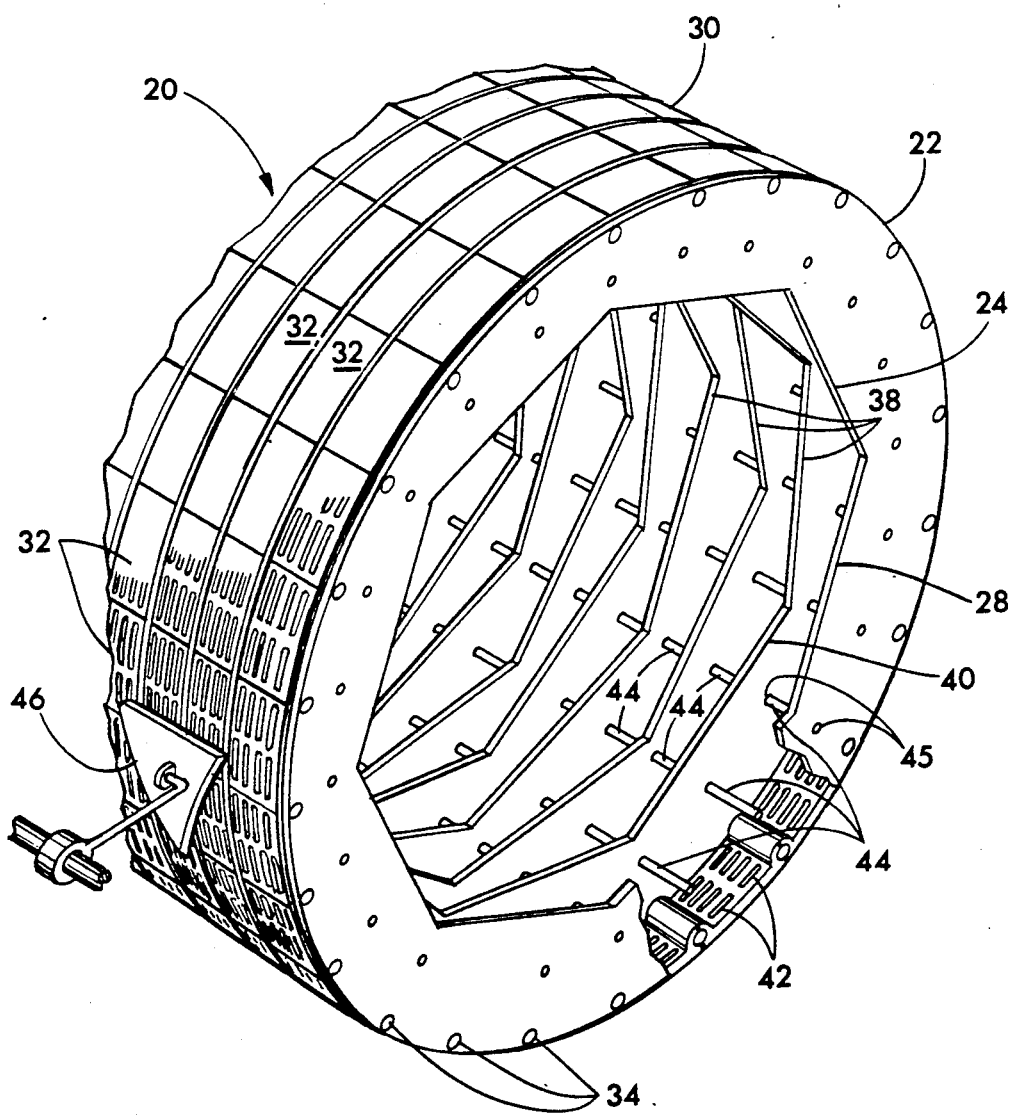
FIG. 3 is an isometric view of the rotatable drum of FIG. 1 shown in proximity to a snipping knife.

Referring more particularly to FIGS. 1-5, wherein like numbers refer to similar parts, the bean snipper 20 has a rotable drum 22. The drum 22 is rotated from the exterior by a conventional mechanism which, for clarity, has been omitted from the drawings. The drum 22 has an entrance 24 for admitting unsnipped beans to the drum and an exit 26 opposite the entrance 24 for discharging snipped beans for further processing. The drum 22 has an exterior surface 30 formed from a multiplicity of pockets 32 which are in the shape of a section of a cylindrical shell. The pockets 32 are of conventional manufacture and will typically be formed of a stiff plastic such as Lexan.

The pockets 32 are mounted on a plurality of axially extending tie rods 34 which are equally spaced around the perimeter of the drum 22 and securely bolted to end plates 36 to form a rigid drum. Metal baffles 38 are also located on the tie rods 34 and are spaced axially along the length of the drum 22 between each group of pockets 32 which form a complete peripheral cylinder. The baffles 38 have a central passage 40 aligned with the axis of the drum 22 which allow beans to pass from the entrance 24 to the exit 26 of the drum 22. The baffle passages 40 are illustrated as octagonal in shape.

The baffles 38 extend above the pockets 32 approximately 5 to 7½ inches. As the baffles 38 are spaced from one another a distance which is less than the length of a typical bean, beans which fall from the upper walls of the drum 22 will tend to be oriented by the baffles 38 into a plane which is aligned with the direction of the circumferential slots 42 which are formed in the pockets 32.

Bean support rods 44 extend between adjacent baffles 38 in the interior of the drum 22 and extend through rod holes 45 in the baffles 38. A support rod 44 is located radially inwardly approximately 3 inches from each tie rod 34. Thus each pocket 32 will be bracketed by two bean support rods 44 running perpendicular to the pocket slots 42 and the baffles 38 and spaced above the pocket surfaces. As the pockets are all of like dimensions, the bean support rods 44 are spaced equidistant from one another around the periphery of the drum inward of the drum surface 30. The support rods 44 have top margins 47 which face radially inward.

The bean support rods 44 are spaced from the pockets 32 a distance which is shorter than the predominant length of the beans to be snipped in the bean snipper 20. The support rods 44 are thus spaced an appropriate distance from the slots 42 that a rod may support a bean which falls into a pocket with an end engaged in a slot 42. As the beans in any harvest will vary in length, certain undersize beans will not necessarily be supported by the rods.

The bean snipper 20 is assembled by engaging a number of pockets 32 on the tie rods 34 which extend from an end plate 36. A metal baffle 38 is then positioned adjacent the ring of pockets and is supported on the tie rods 34. A second ring of pockets 32 may then be put in position and then a second baffle 38, and so on until a drum of the desired length is obtained. The bean support rods 44 are inserted through the rod holes 45 in the baffles.

In operation the drum 22 of the bean snipper 20 is inclined at an angle of approximately 5 degrees such that the entrance 24 is elevated above the exit 26. Unsnipped beans are introduced into the drum 22 at the entrance 24 and the drum 22 is rotated. As the drum rotates, beans fall into the pockets 32 with a portion of those beans falling with their ends protruding beyond the slots 42 where the ends are snipped off by snipper knives 46.

Typically, three to nine banks of knives 46 will be provided on one side of the drum 22. As the drum rotates into the knives 46, the protruding bean ends are snipped. Although a greater number of knives provide redundancy which may ensure more complete snipping, as the knives bear directly against the surface 30 of the drum 22 formed by the pockets 32, a greater number of banks of knives results in faster wear of the pockets necessitating more frequent replacement and increased down time. The bean support rods 44 assist effective snipping such that an excessive number of snipping knives need not be employed.

Figure 4:
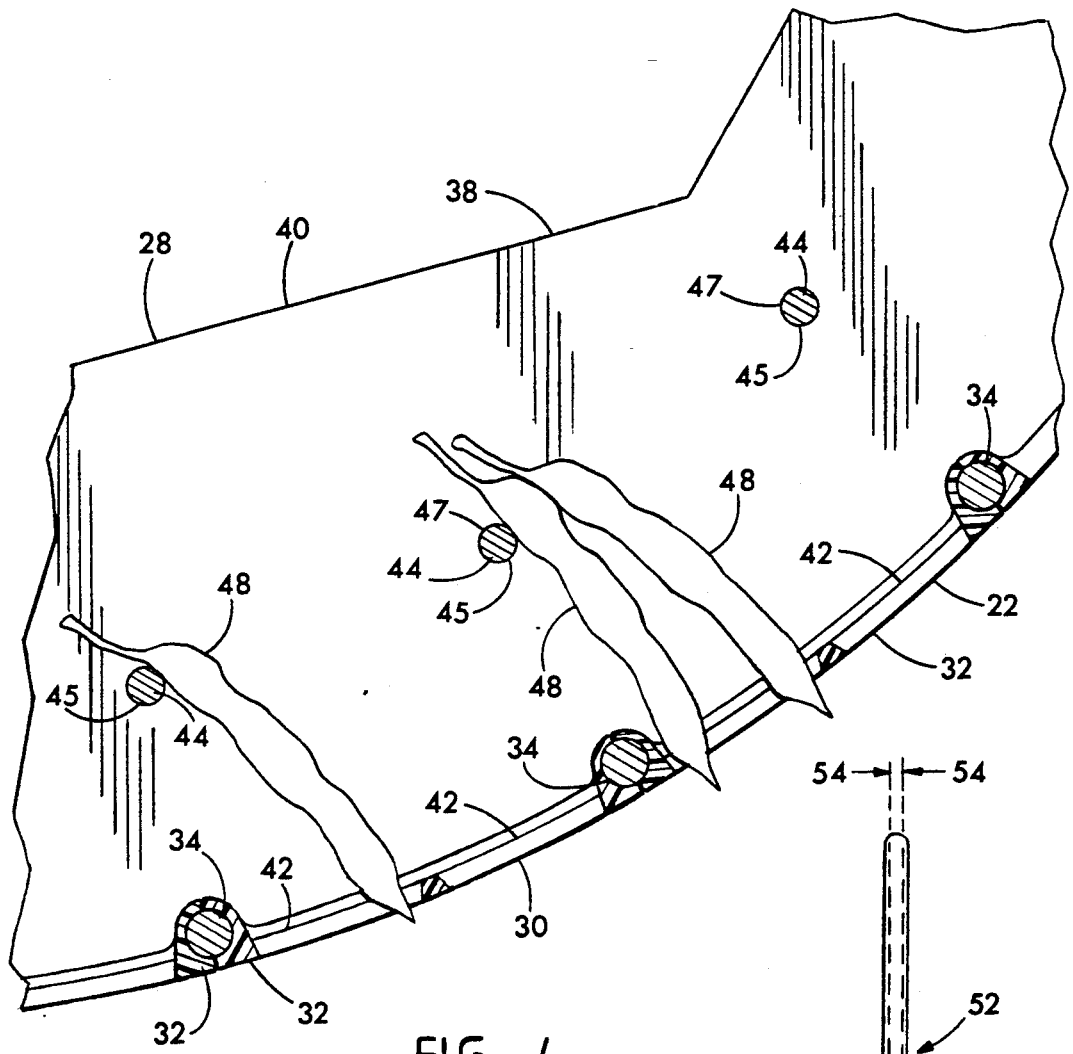
FIG. 4 is a fragmentary cross-sectional view of the drum of FIG. 1 taken along section line 4—4 with an exemplary bean supported therein.

The enhancement of snipping efficiency provided by the bean support rods 44 is illustrated in FIG. 4. Although a few beans 48 have been shown for clarity, in operation of the snipper 20 a plurality of beans will be located in a lower snipper pocket 32 at any one time.

As the drum 22 rotates, beans 48 are carried along the inside wall of the drum and dropped in a shower into the lower interior of the drum. The baffles 38 act to orient beans into a general alignment with the slots 42 of the pockets 32, making it less likely for a bean to fall onto a pocket lying across a slot.

When a bean 48 falls into the slot 42 of a pocket 32, gravity will tend to cause the bean to fall on its side rather than remaining upright. A bean lying on its side blocks the slot 42 and prevents the entrance of other beans for snipping. Furthermore, if not otherwise supported, a bean will slide along the length of the slot as the drum rotates upwardly. A bean which slides during the process of being snipped will not be cleanly snipped and will have a ragged and undesirable end cut.

The bean support rods 44 capture the ends of those beans with an opposite end engaged in a slot 42. Thus propped in place by the support rod 44, the bean 48 is held in optimal snipping orientation and the bean's tendency to slip while being cut is greatly reduced.

The baffles 38 and the bean support rods 44 cooperate to increase the likelihood that a randomly dropped bean will be first aligned in the plane of the pocket slots, and second will be aligned radially for proper snipping.

When the bean support rods 44 are utilized with pockets 32 having wavy slots, the support rods reinforce the tendency of the wavy slots to hold the beans in position. However, the support rods are also effective when utilized with pockets having straight slots.

Furthermore, while the support rods 44 are in position to hold beans upright for snipping, they do not block the passage of beans underneath the rods or otherwise restrict the free circulation of beans which, if blocked, would result in clogging of the pockets 33.

Figure 5:
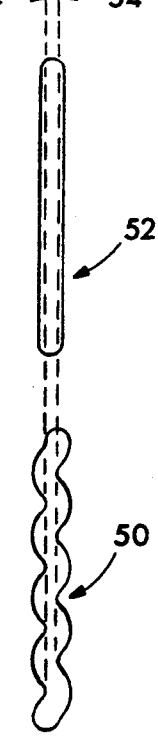
FIG. 5 is a schematic view illustrating the comparative clearances of a wavy slot and a straight slot of a given width.

In FIG. 5, a wavy slot 50 and a straight slot 52 are placed in alignment for illustrative purposes. Both slots have a width of twelve-and-half sixty-fourths of an inch. Yet, as illustrated by broken lines 54, the clearance of the straight slot is significantly greater than that of the wavy slot 50. A stem which is too wide to pass through the narrow clearance of the wavy slot 50 may easily pass through the greater clearance of the straight slot 52. Thus straight slot pockets may be employed with the bean snipper 20 permitting the escape of a greater proportion of stalks and other trash while the bean support rods 44 limit the sliding of the beans within the slots 42.

It is important to note that although the rods 44 have been illustrated and described as cylindrical, the rods may also be flat, fin-like strips which extend in an approximately radial plane as well as extending perpendicularly to the baffles such that the top margins of the rods remain spaced from the surface of the drum.

It should be noted that the bean snipper may also be fabricated of metal cylindrical sections with the slots cut therein or in other similar fashion. Furthermore, the geometry of the baffle passages may be other than octagonal. Also, the size and number of slots and the spacing of the support rods from the pocket surfaces may be varied to accommodate different varieties of beans.

It is understood that the invention is not confined to the particular construction and arrangement of parts herein illustrated and described, but embraces all those modifications which come within the scope of the following claims.

I claim:

1. A bean snipper, comprising:
   a) a rotatable drum having a central passage extending therethrough with an opening adapted to admit beans and an opening adapted to allow the exit of beans, wherein the surface of the drum has portions defining a plurality of slots which extend circumferentially to permit the ends of beans inserted therein to protrude outwardly of the drum;
   b) a plurality of planar baffles axially spaced within the drum and having portions defining a central passage for beans therein;
   c) a plurality of bean support rods extending between adjacent planar baffles, the rods being spaced radially inwardly from the drum surface and extending substantially perpendicularly to the baffles, the rods adapted to support a bean with its end inserted in a slot; and
   d) a snipper knife outside the drum and adapted to snip the end of a bean protruding beyond the surface of the drum.

2. The bean snipper of claim 1 wherein the bean support rods are spaced from the drum surface a distance less than the predominant length of the beans which are to be snipped.

3. The bean snipper of claim 1 further comprising bean support rods equally spaced around the drum interior.

4. The bean snipper of claim 1 wherein the slots formed in the drum are straight.

5. The bean snipper of claim 1 wherein the slots formed in the drum are wavy.

6. A bean snipper, comprising:
   a) a rotatable drum having a central passage extending therethrough with an opening adapted to admit beans and an opening adapted to allow the exit of beans, wherein the surface of the drum is formed of a plurality of cylindrical shell section pockets supported by axially extending tie rods and the pockets have portions defining a plurality of slots which permit the ends of beans inserted therein to protrude outwardly of the drum;
   b) a plurality of planar baffles axially spaced within the drum and supported on the tie rods and having portions defining a central passage for beans therein, the baffles having portions defining rod holes spaced radially inwardly from the tie rods;
   c) a plurality of bean support rods having top margins, the rods extending between planar baffles, the top margins of the support rods being spaced radially inwardly from the drum surface and extending substantially perpendicularly to the baffles, the rods being adapted to support a bean with its end inserted in a slot; and
   d) a snipper knife outside the drum and adapted to snip the end of a bean protruding beyond the surface of the drum.

7. The bean snipper of claim 6 wherein the bean support rods are spaced from the drum surface a distance less than the predominant length of the beans which are to be snipped.

8. The bean snipper of claim 6 wherein the bean support rods are equally spaced around the drum interior.

9. The bean snipper of claim 6 wherein the slots formed in the pockets are straight.

10. The bean snipper of claim 6 wherein the slots formed in the pockets are wavy.

* * * * *